(12) United States Patent
Prust et al.

(10) Patent No.: US 7,871,225 B2
(45) Date of Patent: Jan. 18, 2011

(54) MACHINE TOOL HAVING A WORK SPACE

(75) Inventors: Dirk Prust, Tuttlingen (DE);
Hans-Henning Winkler, Tuttlingen (DE)

(73) Assignee: Chiron-Werke GmbH & Co. KG, Tuttlingen (DE)

( * ) Notice: Subject to any disclaimer, the term of this patent is extended or adjusted under 35 U.S.C. 154(b) by 749 days.

(21) Appl. No.: 11/855,900

(22) Filed: Sep. 14, 2007

(65) Prior Publication Data
US 2008/0080941 A1   Apr. 3, 2008

(30) Foreign Application Priority Data

Sep. 18, 2006   (DE) .................. 10 2006 045 733
Sep. 18, 2006   (DE) .................. 10 2006 045 851

(51) Int. Cl.
*B23Q 11/08*   (2006.01)
*B23C 1/06*   (2006.01)

(52) U.S. Cl. .................. 409/134; 409/235; 160/96; 160/97; 160/84.06; 160/201; 74/608; 451/451; 408/241 G

(58) Field of Classification Search .................. 409/134, 409/235, 135–137; 408/241 G, 710; 160/96, 160/97, 84.06, 201, 223, 222, 202; 384/15; 74/608, 609, 612; 451/451, 454, 455, 457; 29/DIG. 56, DIG. 59, DIG. 60, DIG. 86
See application file for complete search history.

(56) References Cited

U.S. PATENT DOCUMENTS 2,850,332 A * 9/1958 Begle ....................... 160/201

(Continued)

FOREIGN PATENT DOCUMENTS

DE   41 17 699   12/1992

(Continued)

OTHER PUBLICATIONS

European Patent Document No. EP 0 803 317, International Publication Date: Oct. 29, 1997 (English Abstract Only).

(Continued)

*Primary Examiner*—Erica E Cadugan
(74) *Attorney, Agent, or Firm*—Morrison & Foerster LLP

(57) ABSTRACT

A machine tool has a work space (17) in which a device (15) for accommodating workpieces (16) to be machined is arranged. The machine tool further has a work spindle (18) for machining the workpieces (16) and a slide (34) which carries the work spindle (18) and is traversable in a longitudinal direction relative to the device (15), a respective cover (25), variable in length in the longitudinal direction (x), for the work space (17) being provided on the slide (34) on each of its sides, said cover (25) being connected with its respective first end to the slide (34) and with its respective second end to a side wall (21, 22; 51) of the work space (17). Each cover (25) variable in length has a respective rear wall (26) and a respective top (27), whereby the top (27) is connected to the rear wall (26) in a detachable, push-in, manner. A further flexible cover (31) is arranged in front of the slide (34) to protect the work space (17) at the bottom. The flexible cover (31) is variable in a direction (y) orthogonal to the longitudinal direction (x) and is partly designed as a link apron (54).

25 Claims, 8 Drawing Sheets

U.S. PATENT DOCUMENTS

| | | | |
|---|---|---|---|
| 3,475,064 A * | 10/1969 | O'Rourke | 409/134 |
| 4,596,162 A * | 6/1986 | Walter et al. | 74/608 |
| 4,762,020 A * | 8/1988 | Schmidberger et al. | 74/612 |
| 5,235,874 A * | 8/1993 | Tabellini | 74/608 |
| 5,624,363 A | 4/1997 | Kuriki | |
| 6,276,427 B1 * | 8/2001 | Eisner | 409/134 |
| 6,591,888 B2 * | 7/2003 | Benedetti | 160/122 |
| 6,749,495 B2 | 6/2004 | Niederberger et al. | |
| 7,261,501 B2 * | 8/2007 | Condrau et al. | 409/134 |
| 2002/0077052 A1 | 6/2002 | Grund et al. | |
| 2003/0121362 A1 * | 7/2003 | Goellner | 74/608 |
| 2006/0270540 A1 * | 11/2006 | Takayama et al. | 409/134 |
| 2007/0042882 A1 * | 2/2007 | Konvicka et al. | 409/134 |
| 2008/0202707 A1 * | 8/2008 | Benedetti | 160/219 |

FOREIGN PATENT DOCUMENTS

| | | |
|---|---|---|
| DE | 199 56 900 | 5/2001 |
| DE | 298 24 689 | 4/2002 |
| DE | 202 08 600 | 10/2002 |
| DE | 202 20 812 | 5/2004 |
| EP | 0 803 317 | 10/1997 |
| EP | 1 350 595 | 10/2003 |
| JP | 04-183554 A * | 6/1992 |
| JP | 08-108340 A * | 4/1996 |
| JP | 08-276346 A * | 10/1996 |
| JP | 11-048083 A * | 2/1999 |
| JP | 2002-137143 A * | 5/2002 |
| JP | 2006-263826 A * | 10/2006 |
| WO | WO-92/21480 | 12/1992 |
| WO | WO-01/38044 | 5/2001 |

OTHER PUBLICATIONS

German Patent Document No. DE 202 08 600, International Publication Date: Oct. 17, 2002 (English Abstract Only).

German Patent Document No. DE 202 20 812, International Publication Date: May 19, 2004, (English Abstract Only).

German Patent Document No. DE 298 24 689, International Publication Date: Apr. 18, 2002 (English Abstract Only).

* cited by examiner

MACHINE TOOL HAVING A WORK SPACE

CROSS-REFERENCE TO RELATED APPLICATIONS

The present application claims priority under 35 U.S.C. §119 to German Application No. 10 2006 045 851.6, filed Sep. 18, 2006, and German Application No. 10 2006 045 733.1, filed Sep. 18, 2006.

BACKGROUND OF THE INVENTION

1. Field of the Invention

The present invention relates to a machine tool having a work space in which a device for accommodating workpieces to be machined is provided, having a work spindle for machining the workpieces and having a column which carries the work spindle and is traversable in a transverse direction relative to the device, whereby the work space is at least partly covered at the bottom by a cover variable in length in the transverse direction and connected to the column.

2. Related Prior Art

Such a machine tool is known from DE 41 17 699 A1.

The known machine tool is a so-called travelling column machine in which a first x slide is arranged so as to be traversable in the longitudinal direction relative to a work table. Arranged on the x slide is a y slide, which is traversable transversely to the longitudinal direction, that is to say in the y direction. This y slide is also called a column.

Arranged on the column is a spindle head, which is traversable perpendicularly to the x direction and y direction, that is to say in the z direction. This spindle head, which is also designated as headstock, carries a work spindle, into which different tools are introduced as replacements for machining a workpiece clamped in place in a device on the work table.

In this way, the tools can be traversed relative to the workpiece in the three orthogonal spatial axes x, y and z.

During the machining of the workpieces, chips are produced on the one hand and cutting and cooling fluid is sprayed on the other hand, for which reason the machine tool as a whole is encapsulated with respect to the outside by a booth or paneling. In addition, chips or fluid must be prevented from reaching the guide rails and drive units for the slides and other devices. For this reason, the work space of the machine tool, that is to say the region in which the workpiece is machined with the tool, is encapsulated once again relative to the rest of the machine tool.

In the known machine tool, this encapsulation of the work space is effected by covers which are variable in length and which are arranged on both sides of the x slide and extend right up to the outer walls of the work space. These covers variable in length each consist of a rear wall and a top which are formed by a folding bellows which is of L-shaped design in cross section. This folding bellows is mounted on a plurality of frames which are Z-shaped in cross section; the bottom beam of the Z-shaped frames is guided behind the work space on guide rails and is held in such a way as to prevent tilting.

Between the two covers variable in length in the x direction, a top cover variable in length in the y direction and in the form of a further folding bellows is also provided in the region of the top and is arranged between the front wall of the paneling and the headstock.

Further to the two covers variable in length already described, this machine tool has a further cover extending in y direction and being also variable in length, this cover being arranged below the work space to cover guide rails present there.

In this way, a work space is formed in front of the guides and the individual slides, which work space is defined by the rear and top covers and by the side walls and front wall of the booth and in which the workpieces are machined. In this case, despite the good traversability of the work spindle, sufficient sealing of the work space is provided for by the variability in length of the individual covers.

It is not described in this piece of prior art whether a sealing of the guides of the headstock on the column is provided for.

EP 0 803 317 A1 also discloses a machine tool in which the work space is encapsulated in the bottom region by fixed covers and in the top region by covers variable in length. As with the machine tools described at the outset, this machine tool is also a "travelling column machine", in which two cheeks are arranged on the left and right on the x slide, between which cheeks the column can traverse in the y direction and the headstock can traverse in the z direction. Roll-up covers are provided on the left and right on the cheeks running obliquely upwards, and these roll-up covers, as oblique covering, cover the work space at the top and at the rear, a further roll-up cover being provided between the two cheeks, this further roll-up cover closing off the work space from the headstock at the top.

It has now emerged that the covers in the machine tools mentioned at the outset present problems both during fitting and in operation; on the one hand they are difficult to manipulate and on the other hand they impair the free mobility of the traversing mechanism via which the work spindle can be traversed in the three orthogonal axes relative to the workpiece. In the machine tool known from EP 0 803 317 A1, these problems are removed by a relatively light roll-up system which winds up automatically; however, this machine tool involves a special construction having a "suspended" spindle, and the x slide is clearly arranged above the workpiece and even above the work space, into which the work spindle plunges from above. For this reason, the known construction can only be used for relatively narrow machine tools.

The cover variable in length and provided below the work space according to DE 41 17 699 A1 is not disclosed to more extent in that piece of prior art, but it emerges from the drawings that this cover consists of lamellae moving one above the other. When such a cover is arranged below the work space, the to some extent very hot chips will fall upon this cover, such that there is the permanent risk that the lamella cover will jam or will be damaged otherwise.

From DE 298 24 689 U1 it is known to use link aprons as an alternative to telescoping covers with machine tools.

SUMMARY OF THE INVENTION

In view of the above, it is an object of the present invention is to improve the machine tool mentioned at the outset in such a way that, in a simple construction, reliable and effective covering of the work space is also provided for in particular when machine tools having large work spaces, that is to say large dimensions in particular in the x and y directions, are required.

According to the invention, these and other objects are achieved in the machine tool mentioned at the outset in that the cover comprises a flexible cover movable in a displaceable manner in the transverse direction, preferably a link apron, that is connected to the column and guided in rails.

The object underlying the invention is completely achieved in this way.

The inventors of the present application have recognized that a traversable or displaceable link apron, which is a preferred embodiment of the in itself moveable or flexible cover, offers a technically very simple solution for the cover, variable in length, of the work space at the bottom; the link apron is advanced and retracted during the traverse of the column in the y direction, and no costly lamella bellows or roll-up covers are required. Furthermore, a type of positive driving is obtained by the rails, in which case, furthermore, a wind-up mechanism, etc., can be dispensed with, a factor which is likewise advantageous from the construction point of view. Furthermore, the rails provide for sealing of the movable cover relative to the cheeks.

However, this is not only simpler from the construction point of view than the lamella cover known in the prior art, the link apron also offers the further advantage that it is not possible for chips falling onto the cover to lead to jamming, that is to say impairment or complete failure, of the variability in length of the cover. This is because the link apron is pushed forwards and backwards as an entity, such that chips cannot impair this displacement.

Compared with the roll-up system known in the prior art as a cover variable in length, there is the further advantage that the movable cover or link apron can be made of metal, such that it can also absorb very hot and heavy chips and larger volumes of cutting and cooling fluid without the cover being damaged. This is not the case to this extent with a roll-up system.

The movable or flexible cover, which may also be made of a flexible material of sufficient thermal resistance and strength, can in this case hang down beyond the front edge of the carrier or slide on which the column is arranged to be traversable in the y direction. During the traverse of the column, that section of the link apron which covers the work space at the bottom and thus protects the guides of the column from chips, coolant, etc., therefore becomes longer or shorter.

According to a further object, the link apron is connected to the column via a lever which is connected in an articulated manner to both the link apron and the column.

It is advantageous here that the column can be provided with a possible movement which goes beyond the guideway for the link apron. By means of the articulated lever, provision is then made for the top end of the link apron to be able to pivot, for example, under the column. This measure therefore also enables the bottom region of the work space to be covered in simple manner from the construction point of view.

According to another object, the link apron has, in the region of the lever, lateral protective plates, between which a rigid protective cover is provided and which are connected in an articulated manner to a further protective cover, which at the other end is connected in an articulated manner to the column at its front edge.

It is advantageous here that the work space is not only covered at the bottom but also at the rear and below the column, the articulated connections permitting a cover which is of simple construction on the one hand and does not impose any restrictions on the possible movements of the column on the other hand.

The rigid and the further protective cover in this case form a type of hinge which, during the return of the column, is pulled back by the lever tilting backwards, such that it folds up correctly, that is to say does not swing over forwards. The importance of the lever can be recognized here too.

According to still another object, the further cover has a rigid front cover which runs downwards and forwards in a curved manner in front of the slide and is arranged directly below the rails, such that the link apron moves over the front cover during the traverse of the column.

It is advantageous here that the movable link apron only needs to be provided in the region which corresponds to the traverse path of the column in the y direction. In this way, the moving mass is further reduced and the construction is also further simplified.

It is preferred in this case if the link apron has, at its free front end, a wiper strip which is in contact with the front cover.

It is of advantage here that, during the forward travel of the column, chips and fluids which lie on the rigid, front covers are wiped off forwards, such that they cannot get under the link apron, via which they would then get under the cover during the return travel of the column.

In general, it is also preferred if a vertical roll-up cover is provided on the column, which roll-up cover is connected to the headstock and covers its guide, the roll-up cover furthermore having a roll-up canister which is arranged on the headstock and in which the roll-up cover is wound up, which is fastened with its free bottom end to a bottom edge of the column.

It is advantageous here that the guides of the headstock on the column are also covered.

According to a further object, a headstock carrying the work spindle is mounted on the column, which headstock is mounted on the column in a traversable manner orthogonally to the longitudinal direction and the transverse direction.

These are measures known per se; they lead to a "travelling column machine" in which the tool is traversed in all three directions relative to the workpiece. However, the invention can also be used in other machine tools in which not all the axes are present in the tool, but rather one or two axes, for example, are present in the workpiece, such that the workpiece is displaced in these axes relative to the work spindle.

In view of this, the invention also concerns machine tools of the type mentioned at the outset, wherein, however, the tool is fixed in all three directions, such that all traverse movements can be found within the workpiece.

According to another object, a respective cheek is fastened on both sides of the slide, the column being traversable between the cheeks in the transverse direction orthogonally to the longitudinal direction, which column is preferably sealed off from the cheeks via a wiper plate, whereby the moveable cover of the invention is preferably guided between the cheeks and protects the column and the guides at least in part.

This measure has constructional advantages. As the columns and the headstock traverse between the cheeks in the y and z direction, respectively, the work space is effectively protected by the cheeks.

In this connection, it is preferred if the front cover which runs downwards in front of the slide in a curved manner.

The advantage here is that the front cover also is arranged between the cheeks, such that the lateral coverage of the front cover is effected by the rails running above the front cover.

According to one object of the invention, a machine tool is provided, said machine tool having a work space in which a device for accommodating workpieces to be machined is provided, a work spindle for machining the workpieces, and a slide which carries the work spindle and is traversable in a longitudinal direction relative to the device, a respective cover, variable in length in the longitudinal direction, for the work space being provided on the slide on each of its sides, said cover being connected with its respective first end to the slide and with its respective second end to a side wall of the work space, each cover variable in length having a respective rear wall and a respective top, whereby the top is connected to the rear wall in a detachable, preferably push-in, manner.

The inventors of the present application have recognized that a considerable problem with the fitting of the covers variable in length, as known from DE 199 456 900 A1 mentioned at the outset, consists in the fact that the very unwieldy, one-piece folding bellows, which forms both the top cover and the rear wall, has to be connected beforehand to the z-shaped frame, likewise protruding to a considerable extent, in order to then be fitted on the machine.

This entails problems not only during the fitting and during possible repair or even replacement work; the mass of this cover with variable length is also so large that it influences the acceleration response and the traverse speed of the headstock, in particular in machine tools of large construction.

However, since the rear wall and the top are now connected to one another in a detachable manner according to the invention, there are clear simplifications in manipulation during both fitting and repair. Furthermore, the novel construction also amazingly enables a lighter cover to be produced.

However, the possibility of producing the rear wall and the top cover in two parts, as it were, now does not correspond to the conventional procedure in the prior art, for this two-part structure has never been provided there precisely because effective covering of the work space cannot be achieved in this way or the connection between the two sections of this cover that are variable in length is complicated and costly.

Although DE 202 08 600 U1 discloses a folding bellows construction wherein the wall bellows and the top bellows are connected to each other in a detachable manner, this construction is such that both bellows are wedged together. When mounted on a machine tool, this construction cannot be disassembled without problems.

However, the inventors of the present application have now recognized that it is nonetheless possible, by appropriate design measures, to use a two-part cover which is simple to assemble and dismantle on the one hand and yet provides for reliable covering on the other hand.

This is preferably achieved by the top being connected to the rear wall in a push-in manner. This push-in facility enables the two parts of the cover that are variable in length to be directly connected to one another during the final assembly of the novel machine tool without screwdriving measures or other time-consuming techniques, such that easy removal, for example, of the top cover is possible even during repair work.

In this case, it is preferred if the rear wall has a vertical lamella bellows and/or if the top has a horizontal lamella bellows which are each produced from telescopic lamellae.

This measure is known per se from the prior art; lamella bellows consisting of telescopic lamellae have proved their worth many times as a cover in the field of machine tools, and they can be designed in such a way that they offer reliable protection against the often very hot chips and fluid.

It is then preferred in this case if lamella has a cover lamella, preferably made of metal, and a support which runs essentially transversely to the cover lamella.

Such lamella bellows are likewise known from the prior art; they have, due to their special construction, not only a good sealing effect but also sufficient inherent rigidity, such that additional supporting measures which are intended to prevent deflection or sagging can be dispensed with. The support in this case may be a plastic support onto which the cover lamella has been fitted. However, it is also possible to form the support in one piece with the cover lamella by the cover lamella being folded.

It is then preferred on the whole if the respective lamellae of the vertical and the horizontal lamella bellows are connected to one another in a push-in manner.

It is advantageous here that the push-in connection is provided, as it were, on the lamellae themselves, which are provided anyway, and it is not necessary to additionally provide further retainers which provide for the push-in facility; this measure is likewise advantageous from the construction point of view.

According to one object of the invention, each lamella has a tongue which runs essentially transversely to the cover lamella and which is connected to the support and via which the lamella is fitted together with the respective other lamella, the tongue of the vertical lamellae preferably having two plates and the tongue of the horizontal lamellae preferably having a latching part which is pushed in between the plates.

This measure is also advantageous from the construction point of view; it is merely necessary to additionally provide a respective tongue in the known covers variable in length, the assembly being simplified by virtue of the fact that, after the fitting of the vertical lamella bellows, the top cover can be pushed in, as it were, transversely and laterally, removal of the horizontal lamella bellows also being possible in this way. This measure is therefore not only advantageous from the construction point of view; it also has special advantages with regard to manipulation. There is also the fact that the type of push-in connection according to the invention is of very light construction, and therefore a lightweight cover overall can be provided.

According to a further object, a labyrinth seal is formed between the rear wall and the top, which labyrinth seal preferably comprises two webs which are parallel to one another and of which one is provided on the rear wall and the other is provided on the top, both webs furthermore preferably being extensions of the cover lamellae.

This measure is also advantageous from the construction point of view; this is because, according to the findings of the inventors, this labyrinth seal of simple design results in very good encapsulation of the work space, the mobility of the lamellae relative to one another being retained on the other hand, for even the push-in connection itself permits certain play. In this way, jamming of the novel cover is also prevented.

According to still another object, the top rests at its free front side in a sliding manner on a bearing surface of a front wall of the work space, preferably a front wall of a booth closing off the machine tool to the outside.

It is advantageous here that, as it were, the abutment for the push-in connection is arranged on the booth which is provided anyway; the top therefore rests at the front in a sliding manner on the bearing surface and is held at the rear via the push-in connection of the vertical lamellae. This measure not only has constructional advantages, it also leads to the weight being further reduced.

It is then preferred in this case if the rear wall is guided at its bottom edge in a sliding manner on a guide rail which preferably guides the rear wall in two directions which run orthogonally to one another and to the longitudinal direction, the guide rail, as viewed in longitudinal direction, furthermore having a roof-shaped cross section, which the wall overlaps from above with its bottom edge.

These measures are also advantageous from the construction point of view, for, firstly, they ensure in combination or on their own that the rear wall merely has to be composed of the perpendicular lamellae; the rear cross beam which is provided in the prior art and is intended to prevent tilting is not necessary here. In the simplest case, the guide rail absorbs the weight of the rear lamellae; the tilting is prevented via the push-in connection and the front rest of the top. However, the tilting can be further prevented by the special construction of the guide rail by the latter also absorbing a force in the y direction in addition to the weight of the lamellae in the z direction. If the cross section is roof-shaped, reliable guidance and protection against canting is obtained in a simple construction and in particular with ease of assembly.

It goes without saying that the abovementioned features and the features still to be explained below can be used not only in the respectively specified combination but also in other combinations or on their own without departing from the scope of the present invention.

BRIEF DESCRIPTION OF THE DRAWINGS

An embodiment of the invention is shown in the attached drawing and is described in more detail below. In the drawings.

DETAILED DESCRIPTION OF A PREFERRED EMBODIMENT

Figure 1:
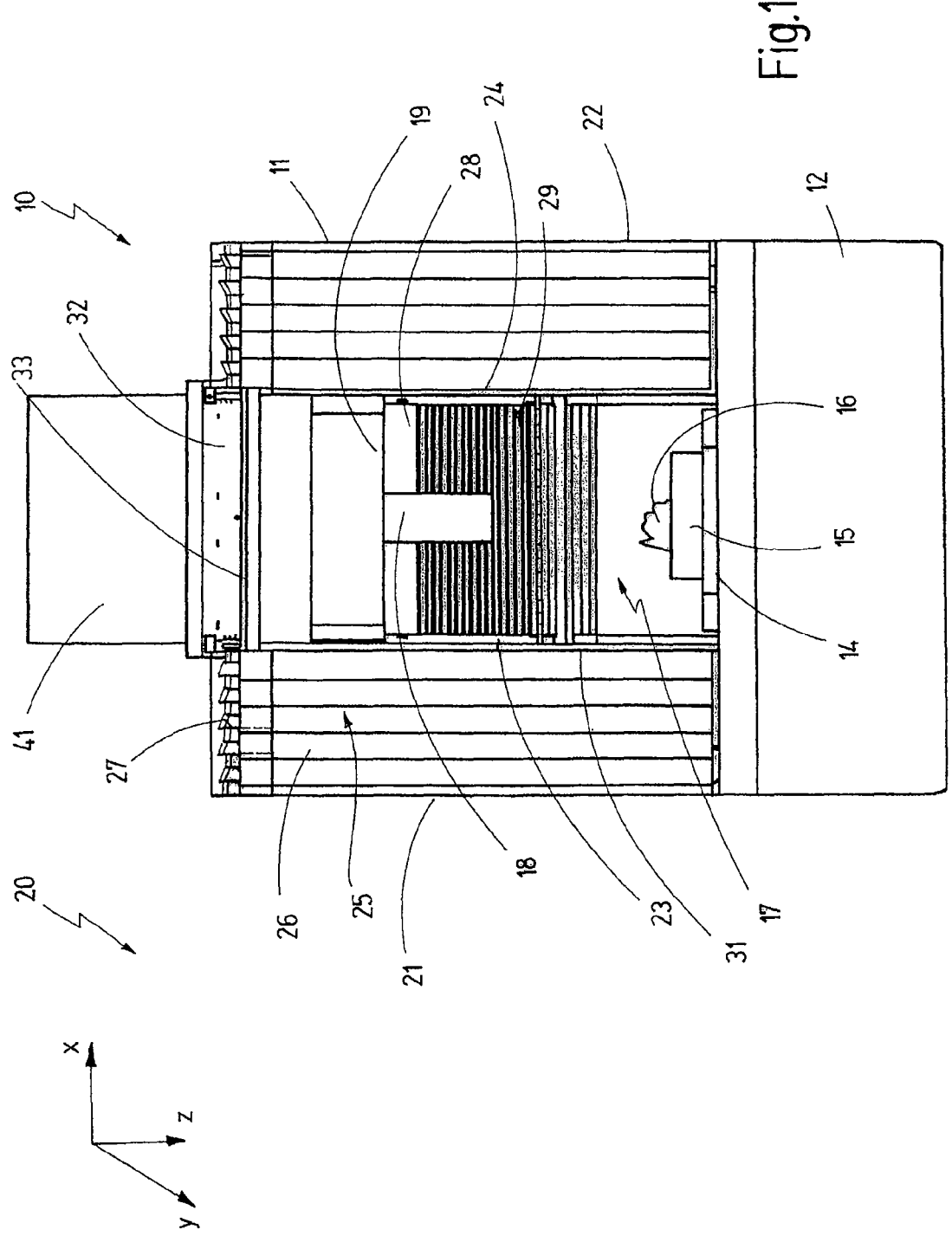
FIG. 1 shows a schematic front view of the novel machine tool.

A machine tool is shown by 10 in a schematic front view in FIG. 1; its paneling 11 is partly removed.

The machine tool has a machine base 12, on which a work table 14 is arranged, which carries a device 15, in which a workpiece 16 to be machined is clamped in place. In FIG. 1, the work table 15 is shown relatively far downwards on the machine base merely for reasons of illustration; it can be arranged markedly higher, such that it is located further upwards in a work space indicated at 17, where the workpiece 16 is then machined by a tool clamped in place in a work spindle indicated at 18. For the sake of clarity, the tool is likewise not shown in FIG. 1; it projects downwards from the work spindle 18 in a manner known per se.

The work spindle 18 is mounted in a headstock 19 which, in a manner still to be described, is mounted on a travelling column so as to be vertically adjustable, said travelling column in turn being mounted on a slide in such a way as to be traversable perpendicularly to the drawing plane, said slide in turn being traversable transversely in the drawing.

In this way, the work spindle 18 is traversable relative to the workpiece 16 in the three orthogonal directions of a coordinate system indicated at 20.

The paneling 11 has a left-hand side wall 21 projecting forwards from the drawing plane and a right-hand side wall 22 likewise projecting forwards from the drawing plane; the front wall of the paneling cannot be seen in FIG. 1. A cover 25 variable in length is provided in each case between the left-hand wall 21 and a left-hand cheek 23 and between the right-hand wall 22 and a right-hand cheek 24. In a manner still to be described, the left-hand cheek 23 and the right-hand cheek 24 are fastened to the x slide; the headstock 19 can traverse between them in the z direction and in the y direction. During the traverse of the x slide in the x direction, however, the covers 25 variable in length vary their length, such that the work space 17 remains closed off at the rear and at the top as a result. For this purpose, the covers variable in length each have a rear wall 26 and a top 27 detachably connected thereto.

Arranged below the headstock 19 is a roll-up canister 28, emerging perpendicular downwards from which is a roll-up cover 29 which covers the guides of the headstock 19 on the column (not shown in FIG. 1).

Shown below the roll-up cover 29 is a further cover 31 which is provided between the cheeks 23 and 24 and which covers the guides, likewise not shown in FIG. 1, of the column, that is to say of the y slide on the x slide.

Provided around the column is a schematically indicated guide frame 32, below which a top cover 33 is provided, which covers the work space at the top and in front of the headstock 19 and extends towards the front side of the booth.

In this way, the work space 17 is completely encapsulated by the two side walls 21 and 22, the two rear walls 26, the two tops 27, the roll-up cover 29, the further cover 31 and the top cover 33 and the front wall (not shown) of the paneling 11, such that chips producing during the machining of the workpiece 16 and diluted soluble cutting and cooling oil cannot reach guides of the traversing mechanism, where they could lead to damage or even breakdowns.

Figure 2:
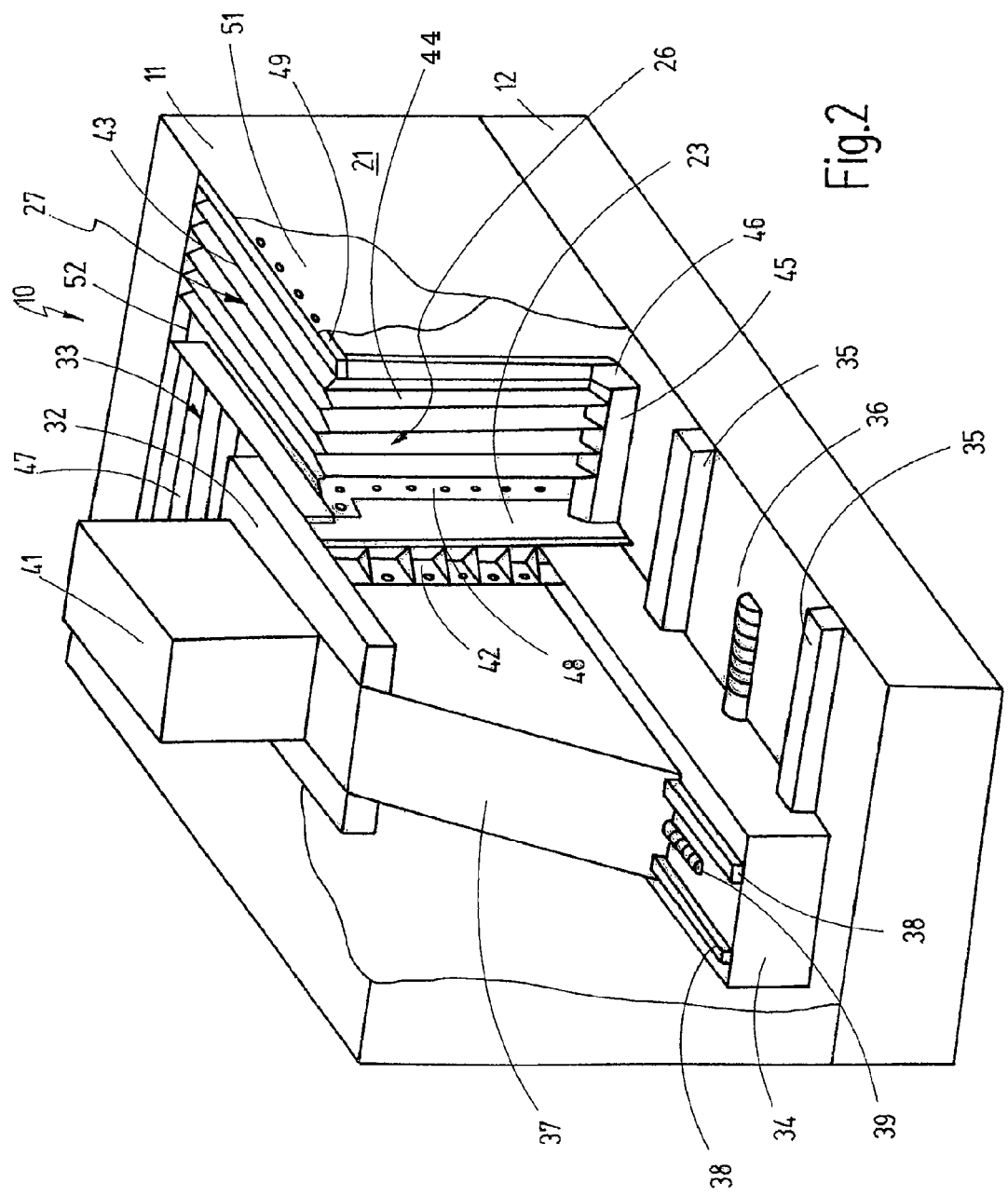
FIG. 2 shows a perspective, schematic view of the machine tool from FIG. 1 obliquely from the rear, with partly broken-away paneling.

The machine tool from FIG. 1 is now shown in FIG. 2 in a schematic and perspective view from the rear and from the left, the paneling 11 partly being broken away.

Arranged on the machine base 12 is an x slide 34 which is traversable in the x direction and which is guided via guides 35 and is traversed via an x spindle 36.

Arranged on the x slide 34 is a column 37, which acts as a y slide. The column 37 is guided on the x slide 34 via guides 38 and is traversed via a y spindle 39.

The headstock 19 shown in FIG. 1 is mounted in a vertically adjustable manner on the column 37 in a manner known per se; only a top headstock cover 41 is shown in FIG. 2, said top headstock cover 41 protecting the headstock and the magazine possibly provided there and surrounding the work spindle.

Furthermore, the left-hand cheek 23, which is fastened to the x slide 34, can be seen in FIG. 2. Also provided on the left-hand cheek 23 is a wiper plate 42, which is in sliding contact with the column 37, such that, during the traverse of the column 37 between the cheeks 23 and 24, chips and fluid which have possibly arrived in the work space 17 on the column 37 are wiped off, so that they cannot get into the rear region of the machine tool 10.

Also shown in FIG. 2 is the top 27, which is designed as a lamella bellows 43. The rear wall 26, which is designed as a lamella bellows 44, can also be seen.

The lamella bellows 44 is guided at its rear end on a guide rail 45 which extends in the x direction and has a roof-shaped cross section 46. In this way, the guide rail 45 carries the lamella bellows 44 and prevents it from tilting.

A further y lamella bellows which forms the top cover 33 is indicated at 47.

The lamella bellows 43 and 44 are fastened to the cheek 23 via a perforated plate 48; at the other end, the two lamella bellows are connected via beams 49 to an inner wall 51 of the work space 17 or directly to the side wall 21. It may be mentioned that it is not absolutely necessary for the work space 17 to be laterally defined by the side walls 21, 22; it may also be defined by inner walls 51 lying further on the inside, as is indicated in FIG. 2.

Finally, it can also be seen that the lamella bellows 43 is guided at its front end on a bearing surface 52 provided on the front side of the paneling 11, such that the horizontal lamella bellows 43 is supported at one end on the bearing surface 52 and at the other end by the vertical lamella bellows 44, which in turn is supported by the guide rail 45.

During the traverse of the x slide 34, the rear wall 26 and the top 27 therefore become shorter or longer, although the encapsulation of the work space over which they reach is retained.

Figure 3:
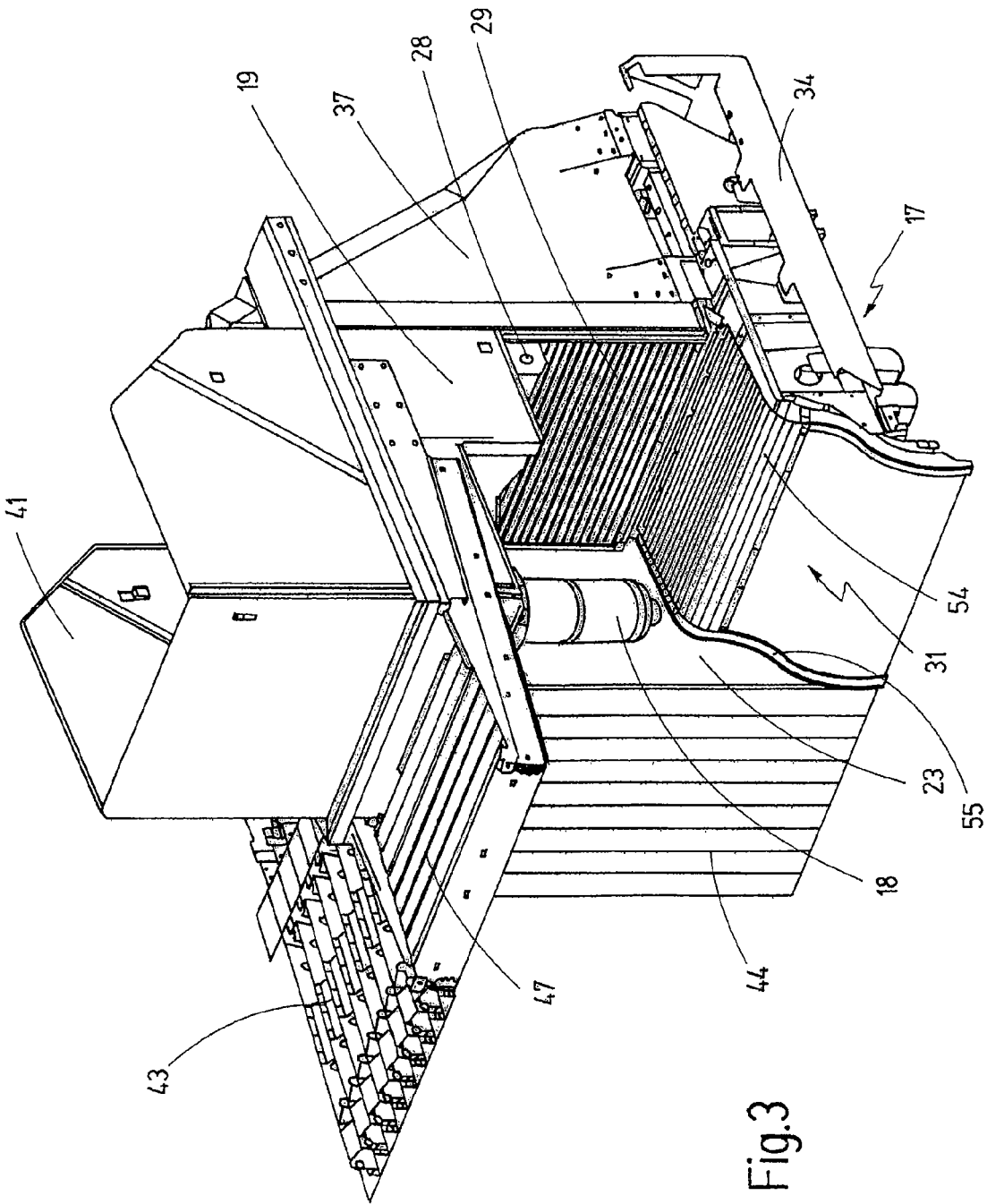
FIG. 3 shows an enlarged perspective view of the work space of the machine tool from FIG. 1, in which the novel covers are shown.

FIG. 3 shows a perspective view of the work space 17 obliquely from the rear, the machine tool otherwise only being shown in cutaway section. Again shown in FIG. 3 is the x slide 34, on which the column 37 carrying the headstock 19 is arranged. The roll-up canister 28, from which the roll-up cover 29 projects downwards, can be seen below the headstock, the roll-up cover 29 being fastened to a front bottom edge of the column 37, such that it becomes longer or shorter when the headstock 19 is traversed in the z direction.

Provided on the left in FIG. 3 is the cheek 23, from which the rear, vertical folding bellows 44 and the top, horizontal folding bellows 43 extend to the left. Finally, the y lamella bellows 47 can also be seen, which extends forwards from the headstock 19 to a front wall (also not shown here) of the paneling.

The further cover 31 which covers the column 37 and its guides and is designed to be variable in length in the y direction, that is in the transverse direction, can now be seen more clearly in FIG. 3.

For this purpose, the further cover 31 comprises a link apron 54, that is to say a cover which consists of individual links movable relative to one another and which is connected at its rear end to the column 37 and is guided in laterally open U-shaped rails 55 which are arranged on the cheek 23 and likewise on the cheek 24 (not shown). In this way, the link apron 54 is positively driven, as it were; it moves forwards or rearwards in the y direction during the traverse of the column 37, in the course of which it follows the curved, downwardly undulating shape of the U-shaped rails 55.

Furthermore, the rails 55 provide for sealing of the link apron relative to the cheeks 23, 24.

Figure 4:
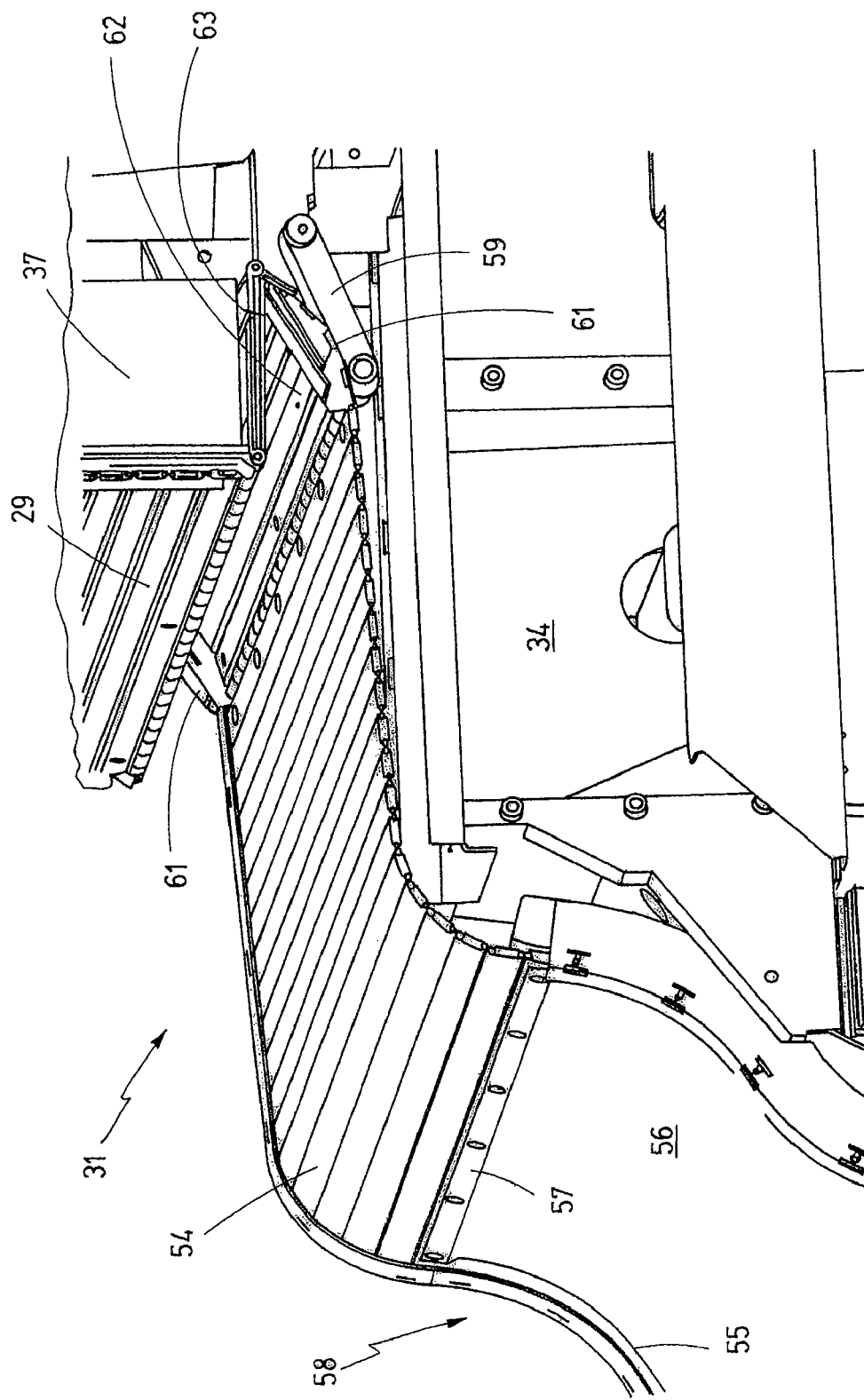
FIG. 4 shows an illustration like FIG. 3, but only in the region of the further cover covering the column and its guide.

The region of the further cover 31 is shown once again enlarged in FIG. 4. The x slide 34 and also the column 37 and the roll-up cover 29 can be seen in cutaway section.

First of all, it can be seen that the further cover 31 has a front rigid cover 56, which runs downwards in front of the x slide 34 in a curved manner and is arranged directly below the U rails 55, such that the link apron 54 moves over the front cover 56 when the column 37 is traversed. The link apron 54 is provided at its front end with a wiper strip 57, which is in contact with the front cover 56, such that, when the column 37 travels forwards and thus when the link apron 54 is displaced to the left and downwards in FIG. 4, chips and fluids which have collected on the front cover 56 move further downwards. This prevents chips and fluids from being dragged along by the link apron 54 during the return travel of the column 37, which chips and fluids could thus get under the further cover 31.

It can clearly be seen in FIG. 4 that the U rails 55 and the further cover 56 are curved downwards at 58; they do not simply go obliquely forwards and downwards. In this way, further space is created by the deflection 58, this space being required, for example, for a tool changer which is arranged at the top around the work spindle 18 and has to extend below the work spindle 18 during the tool change. It can be seen especially well in FIG. 3 that by the deflection 58 space is created directly below the work spindle 18.

Returning to FIG. 4, it can be seen that the link apron 54 is not directly connected to the column 37, but that a lever 59 is provided there which is connected in an articulated manner to both the column 37 and the link apron 54. A further lever is provided on the left-hand side, which cannot be seen in FIG. 4, of the link apron 54. A lateral protective plate 61 is in each case provided on the lever 59, both protective plates 61 being shown in FIG. 4. Extending between the protective plates 61 is a rigid protective cover 62, which is connected in an articulated manner to a further protective cover 63 at its end remote from the link apron 54. At its end remote from the protective cover 62, the protective cover 63 is connected in an articulated manner there to the column 37, where the roll-up cover 29 is also fastened with its bottom end.

In this way, complete covering of the front side of the column 37 and of the region in which the column 37 projects forwards beyond the x slide 34 is obtained. The protective plates 61 at the same time provide for lateral covering; to this end, they are arranged in between the U-shaped rails 55.

Figure 5:
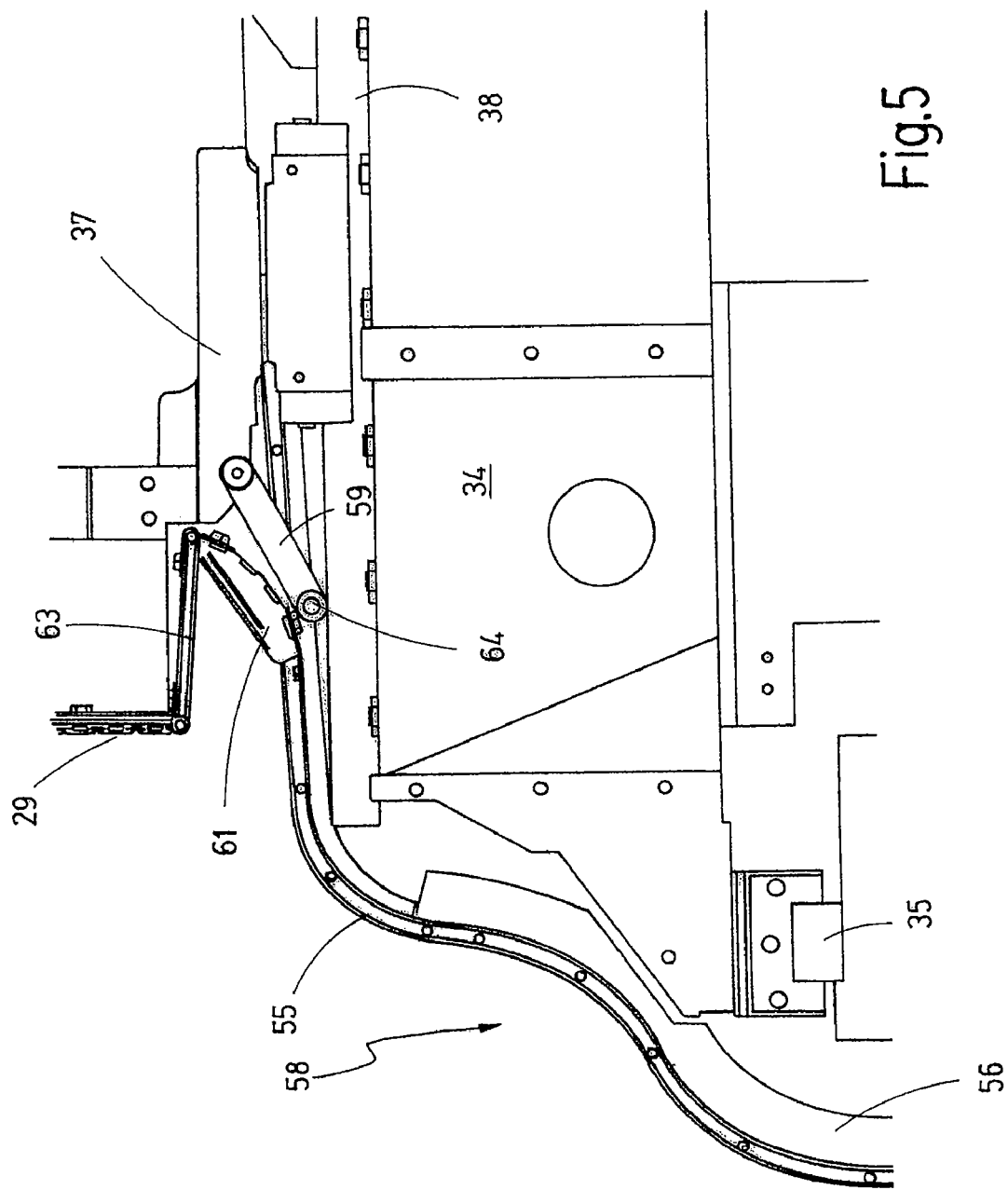
FIG. 5 shows a side view of the illustration according to FIG. 4.

The cutaway section of FIG. 4 is shown once again in FIG. 5 in a schematic side view, the link apron 54 not being shown. The course of the guide rail 55 can be readily seen once again in FIG. 5, said guide rail 55 bulging downwards at 58 in order to then run further forwards and downwards, such that it completely covers the x slide 34.

Furthermore, it can be seen that the lever 59 rests with a front roller 64 on the guide 38, known from FIG. 2, for the column 37.

Figure 6:
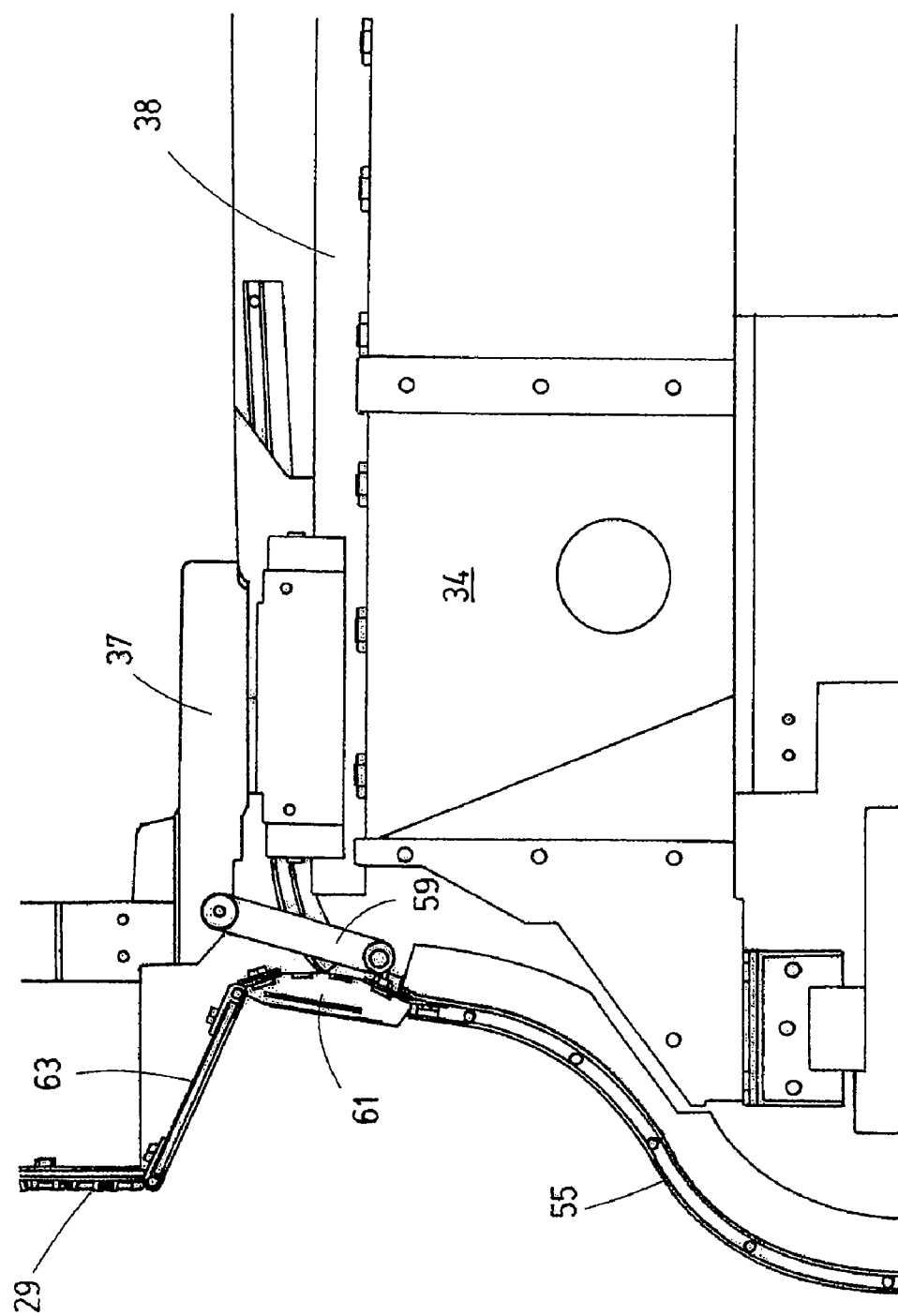
FIG. 6 shows an illustration like FIG. 5, but with the column moved completely forwards in the y direction.

If the column 37 in FIG. 5 is now traversed further to the left, first of all the link apron 54 moves over the front cover 56 (FIG. 4) until finally the lever 59 reaches the front region of the x slide 34. The lever 59 thereupon tilts downwards, as a result of which it simultaneously upends the protective plates 61 and swings the further protective cover 63 downwards. This situation is shown in FIG. 6.

If the column 37 now returns to the right in FIG. 6, the lever again comes into the region of the guide 38, such that it is pivoted clockwise in FIG. 6, in the course of which it carries the link apron (not shown in FIG. 6) along with it.

During both the forward travel and the return travel of the column 37, the lever ensures that the link apron cannot tilt or become jammed in the U-shaped rails 55.

Since the link apron has not been fastened directly to the column 37, the column 37 can be moved further forwards without the risk of the link apron becoming detached or torn off from the column. Due to the interposed lever 59 and the two fulcrums, it is possible to allow the articulation point of the link apron to follow the U rails 55 during the forward travel of the column 37. It can be seen in FIG. 6 that the top fulcrum of the lever 59 is moved well beyond the edge of the x slide 34. If the link apron were to be linked there, it could no longer be guided in the U rail 55. The lever 59 therefore makes possible a better way of traversing the column 37 without the risk of the link apron now indirectly connected to the column 37 via the lever 59 being severely loaded or even becoming detached or torn off.

The protective covers 62, 63 form a type of hinge which stretches into the position shown in FIG. 6 during the forward travel of the column 37, such that the link apron 54 reaches far enough downwards. When the column 37 returns, the lever 59 now ensures that the hinge does not swing over forwards but rather swings below the column 37 again.

Figure 7:
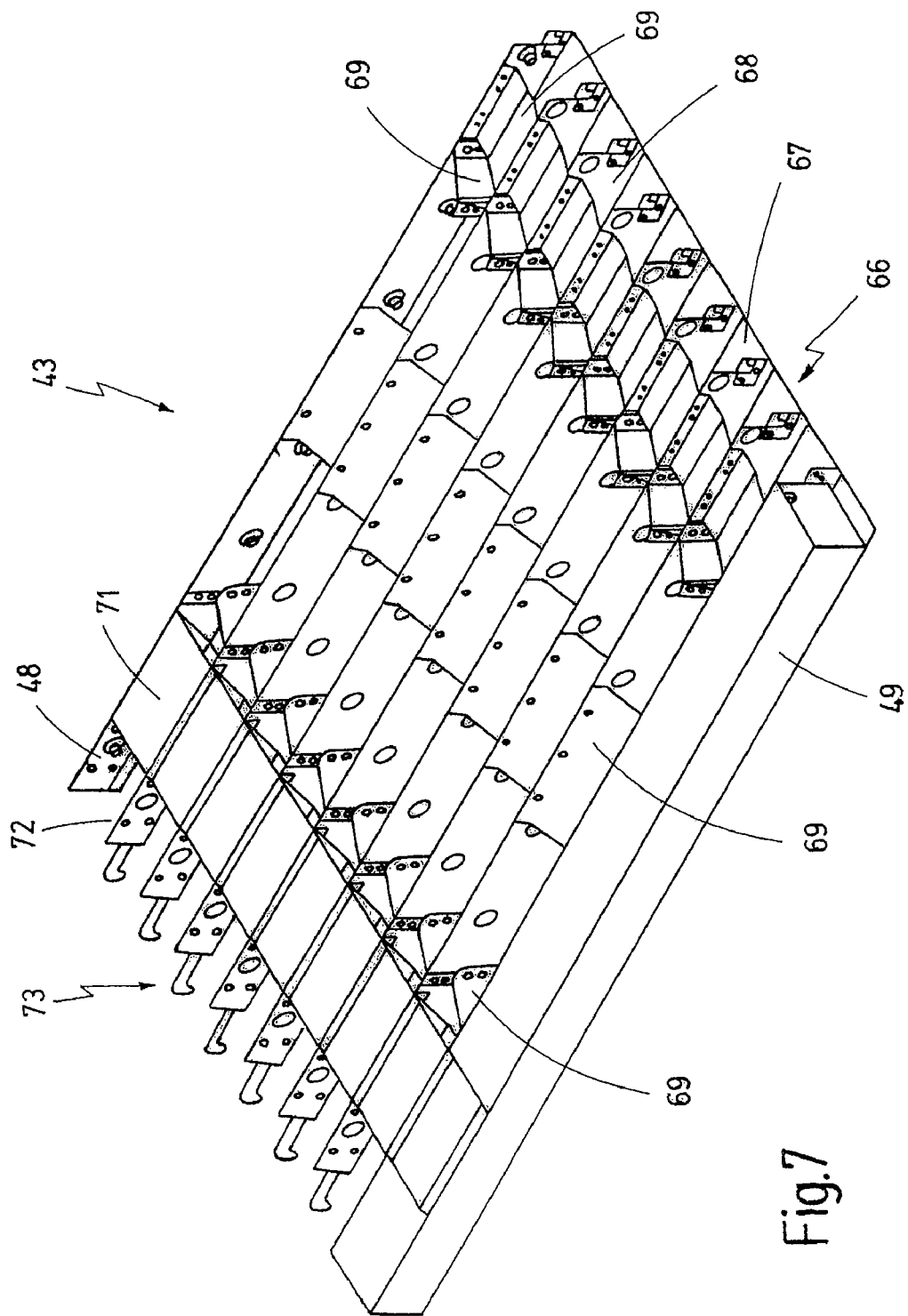
FIG. 7 shows a perspective, schematic illustration of the horizontal lamella bellows forming the top.

Shown in FIG. 7 in a perspective illustration is the horizontal lamella bellows 43, which consists of a plurality of lamellae 66 which are arranged side by side and extend between the beam 49 and the perforated plate 48, both of which are known from FIG. 2.

Each lamella consists of an angled, metallic cover lamella 67 and of a support 68 running perpendicularly thereto. The support 68 is formed in one piece with the cover lamella 67; it has been folded from it. However, it may also be made of plastic, on which the cover lamellae are fitted with pre-stress. Provided between the individual lamellae are plastic strips 69, which run both transversely and longitudinally relative to the supports 68, as a result of which they provide for uniform extending movement of the lamellae 66. To this extent, the lamella bellows is known from the prior art; due to the construction just described, it has appropriate rigidity both in the longitudinal direction and in the transverse direction.

At its top end 69, the lamella bellows 43 is provided firstly with reinforcing lamellae 71 and secondly with sword-shaped extensions or tongues 72, on which there is arranged a respective latching part 73, via which each lamella 66 of the horizontal folding bellows can be connected in a push-in manner to an associated lamella 74 of the vertical folding bellows 44, as will now be explained with reference to FIG. 8.

The vertical lamella 74 likewise have a metal cover lamella 75 and a folded support 76 running transversely thereto. A tongue 77 running essentially transversely to the cover lamella 75 is provided on the support 76. It can also be seen that the tongue 72 runs essentially transversely to the cover lamella 67 of the horizontal lamella 66.

The tongue 77 consists of a rear plate 78 and a front plate 79, which are held together via rivets 81.

The front plate 79 is shown partly broken away; the same applies to a top distance plate 82, which is arranged in exactly the same way as a bottom distance plate 83 between the front and the rear plate 79, 78, such that a passage 84 remains free between the distance plates 82, 83.

The latching part 73 is pushed through this passage 84 and wedges relative to the distance plates 82, 83 with its widened or enlarged head 85 after being pushed through.

This results in a fixed push-in connection, which, however, can be released again by simple manipulation.

In the region of the tongues 72, 77, the horizontal lamella 66 and the vertical lamella 74 are sealed off from one another, for which purpose the cover lamella 67 merges into a web 86 running transversely to the tongue 72, whereas the cover lamella 75 is folded in the region of the tongue 77. In this way, the webs 86, 87 run parallel to one another and merge into one another in such a way that a labyrinth seal 88 is produced.

Figure 8:
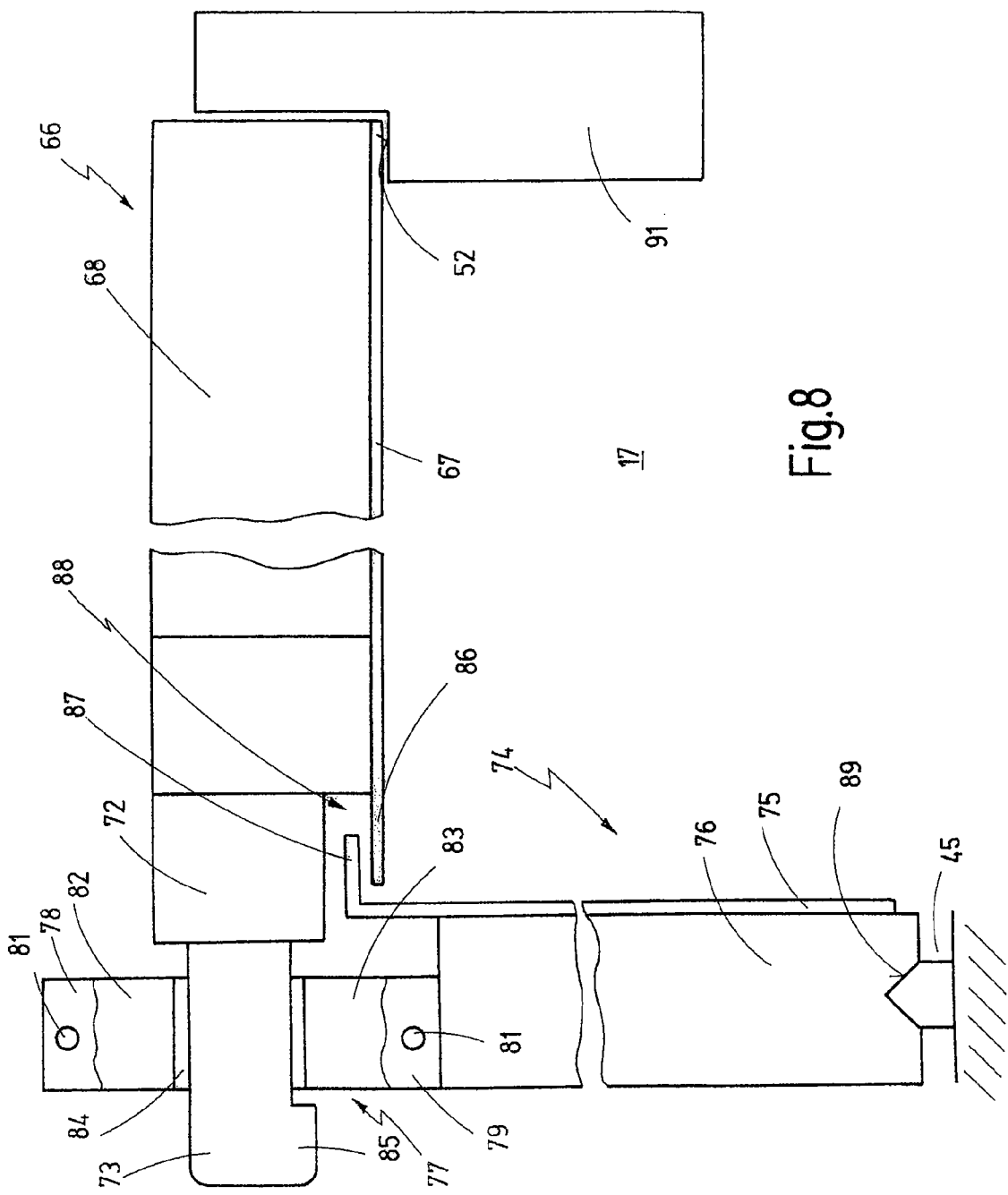
FIG. 8 shows a schematic side view of the push-in connection between a horizontal and a vertical lamella, those guides of the two lamellae which are remote from the push-in connection likewise being shown.

Furthermore, as FIG. 2 already shows, FIG. 8 shows that the vertical lamella 74 is guided on the guide rail 45, for which purpose a roof-shaped cutout 89 is formed in the support 76, said cutout 89 preventing the lamella 74 from being able to pivot laterally in FIG. 8, that is to say in the y direction.

The bearing surface 52 which is already known from FIG. 2, and which is provided in a front wall 91 (shown schematically here) of the paneling 11, serves as a further abutment for the lamellae 66 and 64.

In this way, the already inherently very rigid lamella bellows 43 and 44 are supported on the guide rail 45 on the one hand and on the bearing surface 52 on the other hand, the push-in connection between the individual lamellae 66, 74 being achieved by the tongues 72, 77. On account of the labyrinth seal 88, complete encapsulation of the work space 17 is provided for.

Therefore, what is claimed, is:

1. A machine tool, having a work space in which a device for accommodating workpieces to be machined is provided, having a work spindle for machining the workpieces, and having a column which carries the work spindle and is traversable in a first direction relative to the device, whereby the work space is at least partly covered at the bottom by a cover movable in the first direction and connected to the column and having a proximal end and a distal free end spaced in the first direction, and wherein the cover comprises a flexible cover movable in a displaceable manner in the first direction and being connected to the column at the proximal end and guided in rails, and wherein the distal free end of the flexible cover moves in the rails.

2. The machine tool of claim 1, wherein the flexible cover comprises a link apron.

3. The machine tool of claim 1, wherein the rails are designed as open U-shaped rails.

4. The machine tool of claim 1, wherein the flexible cover is connected to the column via a lever which is connected in an articulated manner to both the flexible cover and the column.

5. The machine tool of claim 4, wherein the flexible cover has, in the region of the lever, lateral protective plates, between which a rigid protective cover is provided and which are connected in an articulated manner to a further protective cover at one end of the further protective cover, which further protective cover at the opposite end is connected in an articulated manner to the column at a front edge of the column.

6. The machine tool of claim 5, wherein a rigid front cover which runs downwards and forwards in a curved manner and is arranged directly below the rails is provided, such that the flexible cover moves over the front cover during the traverse of the column.

7. The machine tool of claim 6, wherein the flexible cover has, at its distal free end, a wiper strip which is in contact with the front cover.

8. The machine tool of claim 1, wherein the column is arranged on a slide that is traversable in a second direction transverse to the first direction.

9. The machine tool of claim 8, wherein a headstock carrying the work spindle is mounted on the column, which headstock is mounted on the column in a traversable manner orthogonally to the second direction and the first direction.

10. The machine tool of claim 8, wherein a respective cheek is fastened on opposing sides of the slide, the column being traversable between the cheeks and being sealed off from the cheeks via a respective wiper plate.

11. A machine tool, having a work space in which a device for accommodating workpieces to be machined is provided, having a work spindle for machining the workpieces, and having a column which carries the work spindle and is traversable in a first direction relative to the device, whereby the work space is at least partly covered at the bottom by a cover movable in the first direction and connected to the column, and wherein the cover comprises a link apron movable in a displaceable manner in the first direction and being connected to the column and guided in rails, wherein the link apron is connected to the column via a lever which is connected in an articulated manner to both the link apron and the column.

12. The machine tool of claim 11, wherein the rails are designed as open U-shaped rails.

13. A machine tool having a work space in which a device for accommodating workpieces to be machined is provided, having a work spindle for machining the workpieces and a slide which carries the work spindle and is traversable in a direction relative to the device, a respective cover, variable in length in the direction, for the work space being provided on the slide on opposite sides of the slide, each said cover being connected with a respective first end thereof to the slide and with a respective second end thereof to a respective side wall of the work space, each cover variable in length having a respective rear wall and a respective top, wherein the top is connected to the rear wall in a detachable, push-in, manner, via a bulged head latching part of the top being pushed through a passage in the rear wall.

14. The machine tool of claim 13, wherein each of the rear walls has a vertical lamella bellows of telescopic lamellae, and wherein each of the tops has a horizontal lamella bellows of telescopic lamellae.

15. The machine tool of claim 14, wherein each lamella has a cover lamella and a support which runs essentially transversely to the respective cover lamella.

16. The machine tool of claim 15, wherein the respective lamellae of the vertical and the horizontal lamella bellows are connected to one another in a push-in manner.

17. The machine tool of claim 16, wherein each lamella has a tongue which runs essentially transversely to the respective cover lamella and which is connected to the respective support and via which a lamella is fitted together with a respective other lamella.

18. The machine tool of claim 17, wherein each of the tongues of the vertical lamellae has two plates and each of the tongues of the horizontal lamellae has a respective one of the latching parts which is pushed in between the respective plates.

19. The machine tool of claim 18, wherein a labyrinth seal is formed between each of the rear walls and the respective top.

20. The machine tool of claim 19, wherein each of the labyrinth seals comprises two webs which are parallel to one another and of which one is provided on the respective rear wall and the other is provided on the respective top.

21. The machine tool of claim 20, wherein the top rests at a free front side thereof in a sliding manner on a bearing surface of a front wall of a booth closing off the machine tool to the outside.

22. The machine tool of claim 13, wherein a respective cheek is fastened on each of the opposite sides of the slide, a flexible cover being provided between the cheeks, which flexible cover is guided between the cheeks, at least partly covers the slide and a guide for the slide and is further designed to be movable.

23. The machine tool of claim 22, wherein the flexible cover comprises a link apron movable in a displaceable manner, which link apron is connected to a column arranged on the slide and said column carrying a headstock mounting the work spindle, whereby the link apron is guided in rails, which are provided on the cheeks.

24. The machine tool of claim 23, wherein a vertical roll-up cover is provided on the column, which roll-up cover is connected to the headstock and covers a guide for the headstock.

25. A machine tool having a work space in which a device for accommodating workpieces to be machined is provided, having a work spindle for machining the workpieces and a slide which carries the work spindle and is traversable in a direction relative to the device, a respective cover, variable in length in the direction, for the work space being provided on the slide on opposite sides of the slide, each said cover being connected with a respective first end thereof to the slide and with a respective second end thereof to a respective side wall of the work space, each cover variable in length having a respective rear wall and a respective top, wherein the top is connected to the rear wall in a detachable, push-in, manner, wherein each of the rear walls has a vertical lamella bellows of telescopic lamellae, and wherein each of the tops has a horizontal lamella bellows of telescopic lamellae, and wherein a labyrinth seal is formed between each of the tops and the respective rear wall.

* * * * *